United States Patent
Mohseni et al.

(10) Patent No.: US 12,448,923 B2
(45) Date of Patent: Oct. 21, 2025

(54) PROTECTIVE TREATMENT AND METHOD OF APPLYING THE SAME

(71) Applicant: Raytheon Technologies Corporation, Farmington, CT (US)

(72) Inventors: Hamidreza Mohseni, Avon, CT (US); Lesley Dawag, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 73 days.

(21) Appl. No.: 18/183,145

(22) Filed: Mar. 13, 2023

(65) Prior Publication Data

US 2024/0309815 A1    Sep. 19, 2024

(51) Int. Cl.
*F02C 7/28*     (2006.01)
*F16J 15/324*   (2016.01)

(52) U.S. Cl.
CPC ........... *F02C 7/28* (2013.01); *F16J 15/324* (2013.01); *F05D 2230/31* (2013.01); *F05D 2240/55* (2013.01)

(58) Field of Classification Search
CPC ........ F02C 7/28; F16J 15/324; F05D 2240/55
USPC ........................................................ 415/230
See application file for complete search history.

(56) References Cited

U.S. PATENT DOCUMENTS

| | | | |
|---|---|---|---|
| 9,228,145 B2 * | 1/2016 | Scharf | C23C 16/45525 |
| 10,920,617 B2 | 2/2021 | Stoyanov et al. | |
| 2018/0291815 A1 | 10/2018 | Munson et al. | |
| 2019/0283340 A1 | 9/2019 | Poteet et al. | |
| 2020/0148340 A1 | 5/2020 | Poteet et al. | |
| 2021/0040892 A1 | 2/2021 | Stoyanov et al. | |
| 2022/0282631 A1 * | 9/2022 | Maalouf | F01D 5/025 |
| 2023/0219859 A1 * | 7/2023 | Nable | C04B 41/5022 |
| | | | 106/14.05 |

FOREIGN PATENT DOCUMENTS

CN        104500743 A        4/2015

OTHER PUBLICATIONS

Extended European Search Report for Application No. EP 24162756-1 dated Aug. 1, 2024.

* cited by examiner

*Primary Examiner* — Mark A Laurenzi
*Assistant Examiner* — Kelsey L Stanek
(74) *Attorney, Agent, or Firm* — Carlson, Gaskey & Olds, P.C.

(57) ABSTRACT

A sealing system includes a shaft, a rotor configured to rotate with respect to the shaft, and a carbon-carbon composite seal ring arranged around the shaft such that it seals against the rotor. The carbon-carbon composite seal ring includes a monoaluminum phosphate binder layer disposed on at least one surface of the carbon-carbon composite seal ring and a ceramic layer disposed over the monoaluminum phosphate binder layer on the least one surface of the carbon-carbon composite seal ring. A method of manufacturing a seal is also disclosed.

20 Claims, 3 Drawing Sheets

PROTECTIVE TREATMENT AND METHOD OF APPLYING THE SAME

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature gas flow. The high-pressure and temperature gas flow expands through the turbine section to drive the compressor and the fan section. The compressor section may include low and high pressure compressors, and the turbine section may also include low and high pressure turbines.

Various components of the engine are exposed to wear conditions, such as seals. Wearing of these components affects their lifetime and effectiveness. There is therefore a need for addressing wear on gas turbine engine components such as seals.

SUMMARY

A sealing system according to an exemplary embodiment of this disclosure, among other possible things includes a shaft, a rotor configured to rotate with respect to the shaft, and a carbon-carbon composite seal ring arranged around the shaft such that it seals against the rotor. The carbon-carbon composite seal ring includes a monoaluminum phosphate binder layer disposed on at least one surface of the carbon-carbon composite seal ring and a ceramic layer disposed over the monoaluminum phosphate binder layer on the least one surface of the carbon-carbon composite seal ring.

In a further example of the foregoing, the shaft is a shaft of a high pressure compressor in a gas turbine engine.

In a further example of any of the foregoing, the rotor is a sixth stage rotor of the high pressure compressor.

In a further example of any of the foregoing, the rotor is an integrally bladed rotor.

In a further example of any of the foregoing, the binder layer is disposed on all surfaces of the seal ring.

In a further example of any of the foregoing, the ceramic layer is disposed on less than all surfaces of the seal ring.

In a further example of any of the foregoing, the ceramic layer includes at least one of SiC, $Si_3N_4$, $SiO_2$, SiOC, TiC, TiN, TiO2, $B_4C$, $ZrSiO_4$, $ZrO_2$, Si Hf—Cr, $Al_2O_3$, $Al_2O_3$—$SiO_2$, SiC/C, BN, Si—B, mullite, $LaB_6$, $MoSi_2$, $Y_2SiO_5$, glass, ternary oxides, $SiO_2$, $Cr_2O_3$, and transition metal dichalcogenides.

In a further example of any of the foregoing, the ceramic coating comprises at least two sub-layers.

In a further example of any of the foregoing, an outermost of the at least two sub-layers has solid lubricity.

In a further example of any of the foregoing, the ceramic layer fills in a sub-surface porosity of the carbon-carbon composite seal ring.

A method of manufacturing a seal according to an exemplary embodiment of this disclosure, among other possible things includes manufacturing a carbon-carbon composite into a seal, impregnating the carbon-carbon composite seal with a solution-based binder to form a binder layer on at least one surface of the seal, and applying a ceramic layer over the binder layer on at least one surface of the seal by atomic layer deposition.

In a further example of the foregoing, the binder layer is monoaluminum phosphate.

In a further example of any of the foregoing, the ceramic layer is one of SiC, $Si_3N_4$, $SiO_2$, SiOC, TiC, TiN, TiO2, $B_4C$, $ZrSiO_4$, $ZrO_2$, Si Hf—Cr, $Al_2O_3$, $Al_2O_3$—$SiO_2$, SiC/C, BN, Si—B, mullite, $LaB_6$, $MoSi_2$, $Y_2SiO_5$, glass, ternary oxides, $SiO_2$, $Cr_2O_3$, and transition metal dichalcogenides.

In a further example of any of the foregoing, the ceramic layer is applied by applying a first sub-layer and a second sub-layer.

In a further example of any of the foregoing, the ceramic coating comprises at least two sub-layers.

In a further example of any of the foregoing, the binder layer is disposed on all surfaces of the seal ring after the impregnating.

In a further example of any of the foregoing, the ceramic layer is applied to less than all surfaces of the seal ring.

In a further example of any of the foregoing, the ceramic layer fills in a sub-surface porosity of the carbon-carbon composite seal ring after the applying.

In a further example of any of the foregoing, the seal is a seal ring, and further comprising arranging the seal around a shaft such that the seal seals against a rotor configured to rotate with respect to the shaft.

In a further example of any of the foregoing, the shaft is a shaft of a high pressure compressor in a gas turbine engine.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
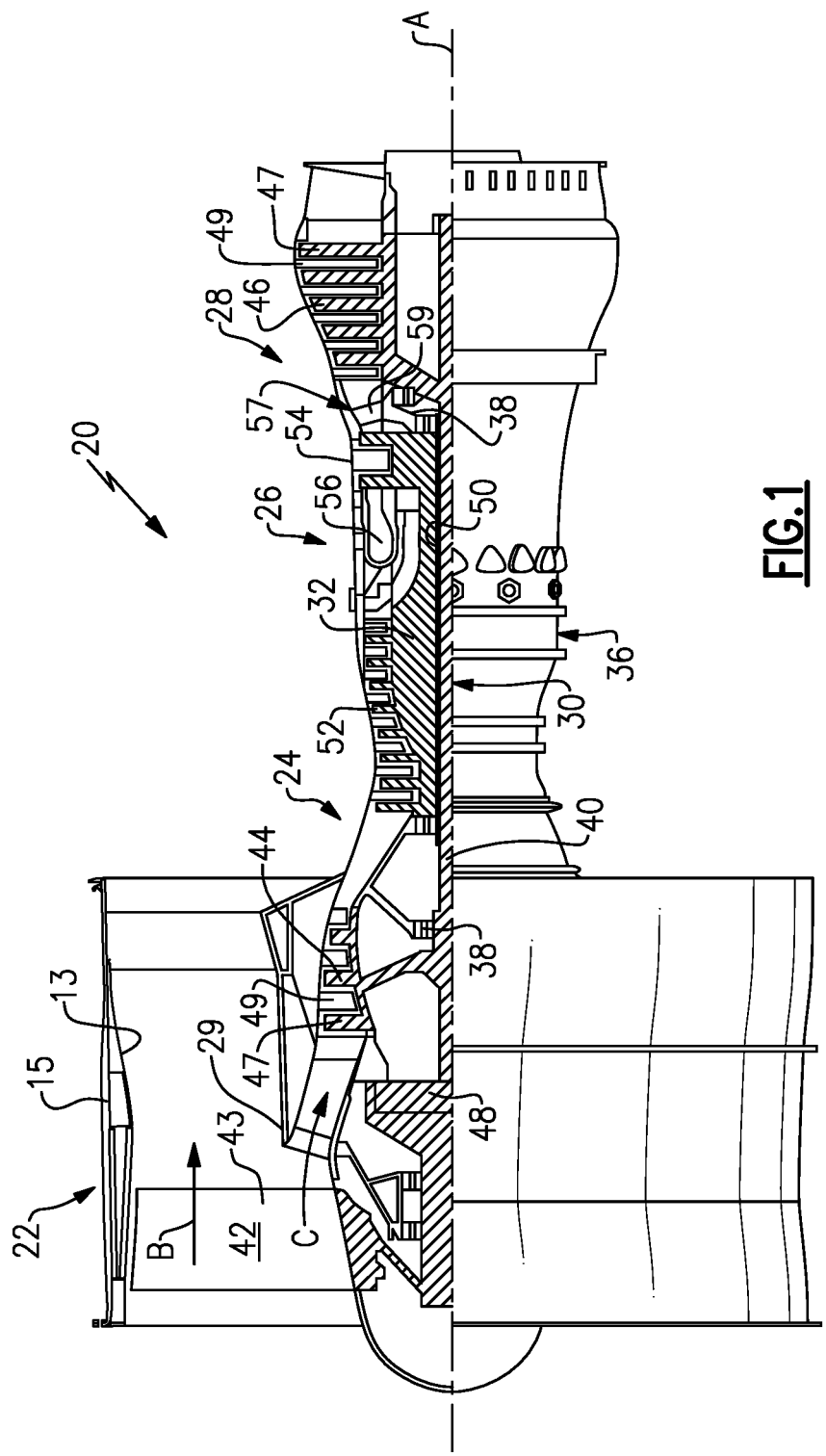
FIG. 1 an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2A:
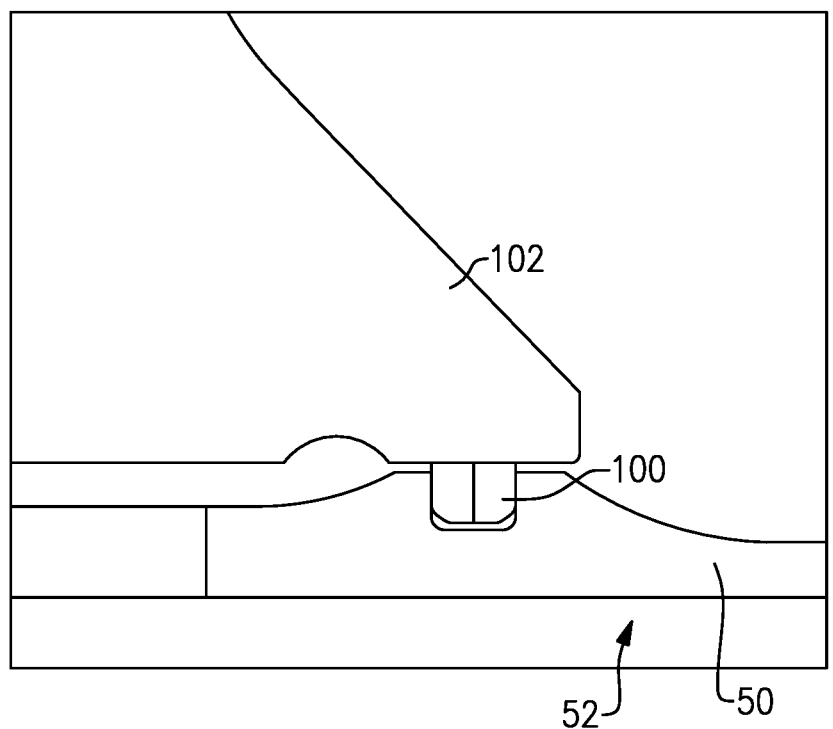
FIG. 2A illustrates an example seal for the gas turbine engine of FIG. 1.

FIG. 2A illustrates an example seal ring 100 for the gas turbine engine 20. In this example, the seal ring 100 is a piston seal ring for a tie shaft of the high pressure compressor 52, shown in FIG. 2B, though it should be understood that this disclosure is applicable to other seal rings that may be found throughout the engine 20, or even other types of seals that experience similar wear conditions.

Figure 2B:
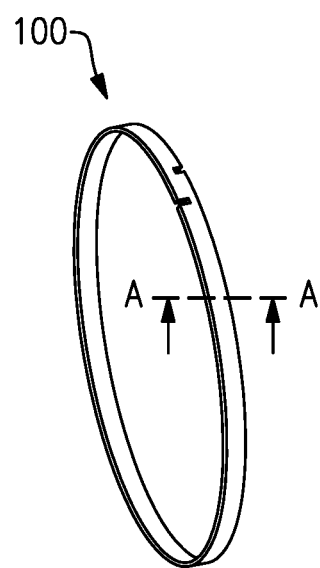
FIG. 2B illustrates an example tie shaft with the example seal of FIG. 2A.

Turning to FIG. 2B, the shaft 50 of the high pressure compressor 52 is shown along with an integrated bladed rotor 102 which is associated with the shaft 50. In this example, a rotor 102, which in this case is an integrally bladed rotor but need not be, is at the sixth stage of the high pressure compressor 52, though it should be understood other stages, as well as stages in the low pressure compressor 44 are also contemplated. The seal ring 100 is arranged around the shaft 50 and seals against the rotor 102.

One example material choice for the seal ring 100 is a cobalt alloy. The seal ring 100 is typically coated with a metal-based protective coating such as a copper-aluminum coating which protects the seal ring 100 from wear and oxidation and a dry-film lubricant which improves the sealing effectiveness of the seal ring 100. However, during operation of the engine 20 wear on the seal ring 100 causes the dry-film lubricant to be removed and the protective coating to wear out. Once this occurs the seal ring 100 approaches the end of its lifetime. In addition, the seal ring 100 itself may be prone to sub-surface cracks that result from manufacture of the seal ring 100 which contribute to a decrease in its lifetime.

Carbon-carbon composites (which are, generally, carbon reinforcements dispersed in a carbon matrix) provide good wear protection but are known to degrade at elevated temperatures (e.g., temperatures over about 450 degrees C.) due to oxidation that increases their wear rate. The seal ring 100 may be exposed to such elevated temperatures during operating of the engine 20. However, it has been discovered that the oxidation resistance of carbon-carbon composite seal rings can be improved as will be discussed below, enabling their use on seal rings such as the seal ring.

FIGS. 3A-E show four example carbon-carbon composite bearing seals 200. The carbon-carbon composite is manufactured into the seal ring 100 by any known method. FIGS. 3A-E show views of the carbon-carbon composite seals 200 taken along the axis A-A shown in FIG. 2B.

The carbon-carbon composite seal 200 is impregnated with a solution-based binder such as monoaluminum phosphate to form a binder layer 202 on the carbon-carbon composite seal 200. Solution-based binders are known in the art and will not be discussed in detail here, however, in one example, for impregnation with monoaluminum phosphate the acid aluminum phosphate in the form of a solution is obtained by dissolving aluminum hydroxide in phosphoric acid. The solution can then be impregnated into the carbon-carbon composite seal 200. The impregnation can be by any known method suitable for solution-based materials, which are known in the art.

The binder layer 202 provides oxidation resistance to the carbon-carbon composite seal 200, but it can be difficult to fill the sub-surface porosity of the carbon-carbon composite seal 200 by application of the binder layer 202. Accordingly, the carbon-carbon composite seal 200 also includes a ceramic coating 204 disposed over the binder layer 202. The ceramic coating can be, for instance, SiC, $Si_3N_4$, $SiO_2$, SiOC, TiC, $TiO_2$, $B_4C$, $ZrSiO_4$, $ZrO_2$, Si Hf—Cr, $Al_2O_3$, $Al_2O_3$—$SiO_2$, SiC/C (silicon carbide/carbon composites), Si—B, mullite, $LaB_6$, $MoSi_2$, $Y_2SiO_5$, glass, ternary oxides like $ZnTiO_3$, other oxides such as $Cr_2O_3$, nitrides such as BN or TiN, and transition metal dichalcogenides such as $WS_2$ and $MoS_2$.

The ceramic layer 204 is applied over the binder layer 202 by atomic layer deposition, which provides surface and sub-surface deposition of the target material and addresses the sub-surface porosity of the carbon-carbon composite seal 200. The ceramic layer 204 is deposited thickly enough to fill-in the sub-surface porosity of the carbon-carbon composite seal 200. In a particular example, at least 90% of the sub-surface porosity of the carbon-carbon composite seal 200 is filled in by the ceramic layer 204 after it is applied. That is, the higher the porosity of the carbon-carbon composite seal 200, the thicker the ceramic layer 204. In this way, the binder layer 202 and the ceramic layer 204 work together to provide oxidation resistance to the carbon-carbon composite seal 200.

In addition, atomic layer deposition can be performed at relatively lower temperatures as compared to, for instance, chemical vapor deposition, and is therefore suitable for deposition on temperature-sensitive materials such as the carbon-carbon composite seal 200. Atomic layer deposition also provides uniform, smooth, and conformal deposition of material, which improves the overall oxidation protection, wear characteristics, and lifetime of the carbon-carbon composite seal 200.

Figure 3A:
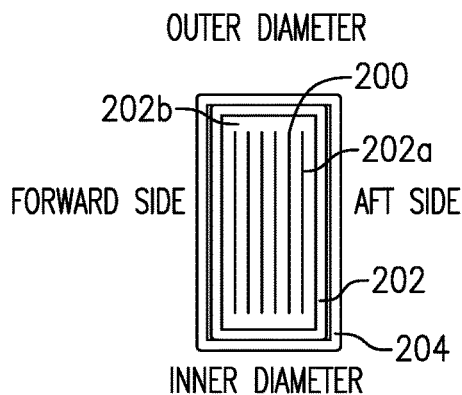
FIGS. 3A-E illustrate the example seal of FIG. 2 with various example protective treatments.
Figure 3B:
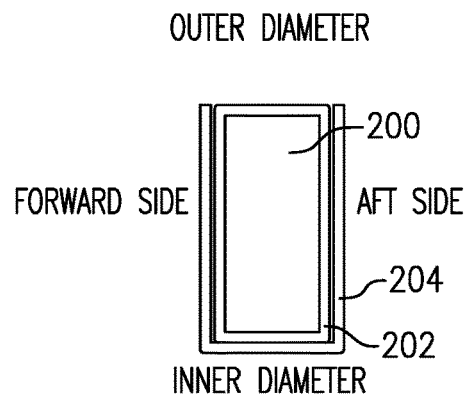
Figure 3C:
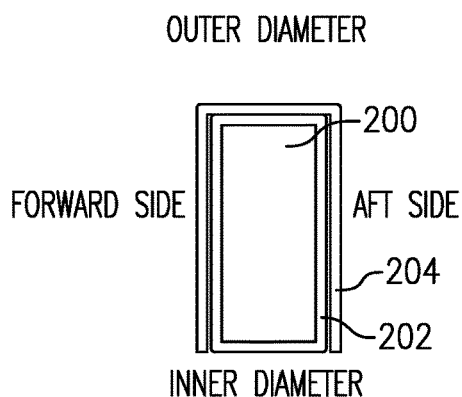
Figure 3D:
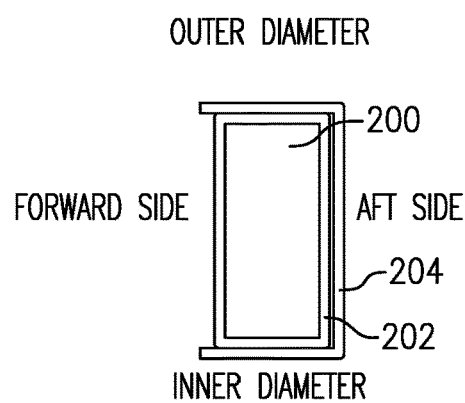
Figure 3E:
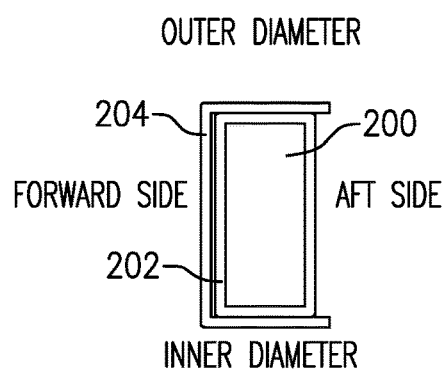

The binder layer 202 and the ceramic layer 204 can be disposed on all or only some of the surfaces of the carbon-carbon composite seal 200 as shown in FIGS. 3A-D. In FIG. 3A, the binder layer 202 and ceramic layer 204 are disposed on all surfaces of the carbon-carbon composite seal 200. In FIG. 3B, the binder layer 102 is disposed on all surfaces of the carbon-carbon composite seal 200 while the ceramic layer 204 is disposed on all but the outer diameter. In FIG. 3C, the binder layer 202 is disposed on all surfaces of the carbon-carbon composite seal 200 while the ceramic layer 204 is disposed on all but the inner diameter. In FIG. 3D, the binder layer 202 is disposed on all surfaces of the carbon-carbon composite seal 200 while the ceramic layer 204 is disposed on all but the forward side. In FIG. 3E, the binder layer 202 is disposed on all surfaces of the carbon-carbon composite seal 200 while the ceramic layer 204 is disposed on all but the aft side.

The ceramic layer 204 can comprise one or more sub-layers, though it should be understood that the multilayer ceramic layer 204 can be used in any of the examples of FIGS. 3A-D. Deposition of multilayer coatings by atomic layer deposition is well known in the art. The sub-layers can be selected to exhibit different properties. For instance, the outermost sub-layer may be selected to have solid lubricity. One example material is ZnO. The innermost sub-layer may be selected to have good compatibility with the carbon-carbon composite seal 200, such as good coefficient of thermal expansion matching. Example materials are ZrO2.

As shown in FIG. 3A but equally applicable to any of the examples in FIGS. 3B-3E as well, the carbon-carbon composite seal 200 comprises reinforcements 202a disposed in a matrix 202b. Alternatively or additionally to the ceramic layer 204, reinforcements 202a may include a coating including, for instance, TiB, TiC, TiN, SiC, Ta, BN, Si, Al, Ni, Co, Cu, $SiO_2$, $Nb_2C$, $Ta_2C$, or ZrC. The coating can be applied by, for instance, chemical vapor deposition (CVD), physical vapor deposition (PVD), electro-plating, liquid precursor method, liquid metal transfer, or any other known method. The coating on the reinforcements 202a improves not only the oxidation resistance of the carbon-carbon composite seal 200 but potentially enhances the adhesion of the reinforcement phase onto the carbonaceous matrix Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A sealing system, comprising:
a shaft;
a rotor configured to rotate with respect to the shaft; and
a carbon-carbon composite seal ring arranged around the shaft such that it seals against the rotor, the carbon-carbon composite seal ring including a monoaluminum phosphate binder layer disposed on at least one surface of the carbon-carbon composite seal ring and a ceramic layer disposed over the monoaluminum phosphate binder layer on the least one surface of the carbon-carbon composite seal ring.

2. The sealing system of claim 1, wherein the shaft is a shaft of a high pressure compressor in a gas turbine engine.

3. The sealing system of claim 2, wherein the rotor is a sixth stage rotor of the high pressure compressor.

4. The sealing system of claim 1, wherein the rotor is an integrally bladed rotor.

5. The sealing system of claim 1, wherein the monoaluminum phosphate binder layer is disposed on all surfaces of the seal ring.

6. The sealing system of claim 5, wherein the ceramic layer is disposed on less than all surfaces of the carbon-carbon composite seal ring.

7. The sealing system of claim 6, wherein the carbon-carbon composite seal ring includes an outer diameter side, an inner diameter side, a forward side, and an aft side, and the monoaluminum phosphate binder layer extends around each of the sides, and wherein the ceramic layer extends around the monoaluminum phosphate binder layer on all but one of the sides of the carbon-carbon composite seal ring.

8. The sealing system of claim 1, wherein the ceramic layer includes at least one of SiC, $Si_3N_4$, $SiO_2$, SiOC, TiC, TiN, TiO2, $B_4C$, $ZrSiO_4$, $ZrO_2$, Si Hf—Cr, $Al_2O_3$, $Al_2O_3$—

$SiO_2$, SiC/C, BN, Si—B, mullite, $LaB_6$, $MoSi_2$, $Y_2SiO_5$, glass, ternary oxides, $SiO_2$, $Cr_2O_3$, and transition metal dichalcogenides.

9. The sealing system of claim 1, wherein the ceramic layer comprises at least two sub-layers.

10. The sealing system of claim 9, wherein an outermost of the at least two sub-layers has solid lubricity.

11. The sealing system of claim 1, wherein the ceramic layer fills in a sub-surface porosity of the carbon-carbon composite seal ring.

12. The sealing system of claim 1, wherein the ceramic layer includes at least one of SiC, $Si_3N_4$, $SiO_2$, SiC/C, and SiOC.

13. The sealing system of claim 1, wherein the ceramic layer includes at least one of TiC, TiN, and TiO2.

14. The sealing system of claim 1, wherein the ceramic layer includes at least one of $B_4C$, Si Hf—Cr, BN, and Si—B.

15. The sealing system of claim 1, wherein the ceramic layer includes at least one of $LaB_6$, $MoSi_2$, $Y_2SiO_5$, ternary oxides, $Cr_2O_3$, and transition metal dichalcogenides.

16. A method of manufacturing a seal, comprising:

manufacturing a carbon-carbon composite into a carbon-carbon composite seal ring;

impregnating the carbon-carbon composite seal ring with a solution-based binder to form a binder layer on at least one surface of the carbon-carbon composite seal ring; and applying a ceramic layer over the binder layer on at least one surface of the carbon-carbon composite seal ring by atomic layer deposition, wherein the carbon-carbon composite seal ring includes a monoaluminum phosphate binder disposed on at least one surface of the carbon-carbon composite seal ring and a ceramic layer disposed over the monoaluminum phosphate binder layer on the at least one surface of the carbon-carbon composite seal ring.

17. The method of claim 16, wherein the binder layer is monoaluminum phosphate.

18. The method of claim 16, wherein the ceramic layer is one of SiC, Si3N4, SiO2, SiOC, TiC, TiN, TiO2, B4C, ZrSiO4, ZrO2, Si Hf—Cr, Al2O3, Al2O3-SiO2, SiC/C, BN, Si-B, mullite, LaB6, MoSi2, Y2SiO5, glass, ternary oxides, SiO2, Cr2O3, and transition metal dichalcogenides.

19. The method of claim 16, wherein the binder layer is disposed on all surfaces of the carbon-carbon composite seal ring after the impregnating.

20. The method of claim 16, wherein the ceramic layer is applied to less than all surfaces of the carbon-carbon composite seal ring.

* * * * *